United States Patent
Schlueter, Jr. et al.

[11] Patent Number: 5,942,301
[45] Date of Patent: Aug. 24, 1999

[54] POLYIMIDE SEAMED BELT

[75] Inventors: Edward L. Schlueter, Jr., Rochester; Laurence J. Lynd, Macedon; Lucille M. Sharf, Pittsford; Robert M. Ferguson; Joseph Mammino, both of Penfield, all of N.Y.

[73] Assignee: Xerox Corporation, Stamford, Conn.

[21] Appl. No.: 09/008,915

[22] Filed: Jan. 20, 1998

[51] Int. Cl.⁶ ..................................................... B32B 3/10
[52] U.S. Cl. ............................................ 428/58; 474/254
[58] Field of Search ................................ 428/58; 474/254

[56] References Cited

U.S. PATENT DOCUMENTS

| 5,487,707 | 1/1996 | Sharf et al. | 474/253 |
| 5,514,436 | 5/1996 | Schlueter, Jr. et al. | 428/57 |
| 5,549,193 | 8/1996 | Schlueter, Jr. et al. | 198/844.2 |

OTHER PUBLICATIONS

Product Information sheet (1 page) and Material Safety Data Sheets (2 pages) on Plymaster 213®.
Brochure (4 pages) titled "Norwood Plymaster® Heat Activated Adhesive Systems." Sep. 1992.
Product Information sheets (2 pages) on Plymaster HT 4033® and HT 4031®. Sep. 1991.
Material Safety Data Sheets on Plymaster HT 4033®. Dec. 1995.
U.S. application No. 08/522,622, filed Aug. 31, 1995, Thomas C. Parker et al., D/93563C, "Puzzle Cut Seamed Belt With Strength Enhancing Strip".
U.S. application No. 08/004554, hand-carried to PTO for filing on Jan. 8, 1998, D/95609, Edward L. Schlueter, Jr. et al., "Polyimide and Doped Metal Oxide Fuser Components".

*Primary Examiner*—Alexander Thomas
*Attorney, Agent, or Firm*—Zosan S. Soong

[57] ABSTRACT

A seamed belt composed of: (a) a belt material including a polyimide and having two ends, each end having a plurality of mating elements, the two ends being joined to form a seam having the mating elements of the two ends in an interlocking relationship where the interlocked mating elements define a space between the interlocked mating elements; and (b) an adhesive present in the space between the interlocked mating elements, wherein the adhesive is selected from the group consisting of: (i) a polyvinyl butyral composition including: a terpolymer of polyvinyl butyral, polyvinyl alcohol, and polyvinyl acetate, and a plasticizer; (ii) a polyurethane composition including a polyester polyurethane polymer; and (iii) a blended composition including an acrylonitrile and butadiene copolymer and a phenol formaldehyde polymer.

10 Claims, 7 Drawing Sheets

POLYIMIDE SEAMED BELT

FIELD OF THE INVENTION

This invention relates to a seamed belt which can be employed for example in a printing machine.

BACKGROUND OF THE INVENTION

The mechanical requirements for fusing belts and intermediate toner image transfer belts are increasing. Conventional seamed fusing and intermediate toner image transfer belts may exhibit one or more of the following problems, which are addressed by the present invention: relatively high seam height and seam adhesive failure before belt material failure.

Conventional seamed belts are disclosed in U.S. Pat. Nos. 5,514,436; 5,487,707; and 5,549,193.

The following documents are also relevant:

Product Information sheet (1 page) and Material Safety Data Sheets (2 pages) on PLYMASTER 213®.

Brochure (4 pages) titled "Norwood PLYMASTER® Heat Activated Adhesive Systems."

Product Information sheets (2 pages) on PLYMASTER HT 4033® and HT 4031®.

Material Safety Data Sheets on PLYMASTER HT 4033®.

SUMMARY OF THE INVENTION

The present invention is accomplished in embodiments by providing a seamed belt comprising:

(a) a belt material comprised of a polyimide and having two ends, each end having a plurality of mating elements, the two ends being joined to form a seam having the mating elements of the two ends in an interlocking relationship where the interlocked mating elements define a space between the interlocked mating elements; and (b) an adhesive present in the space between the interlocked mating elements, wherein the adhesive is selected from the group consisting of:

(i) a polyvinyl butyral composition including: a terpolymer of polyvinyl butyral, polyvinyl alcohol, and polyvinyl acetate, and a plasticizer;

(ii) a polyurethane composition including a polyester polyurethane polymer having the formula

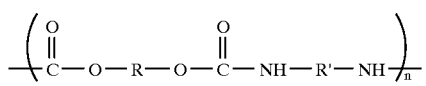

where R is a saturated aliphatic polyester, R' is an aliphatic or aromatic moiety having from 2 to 13 carbon atoms, and n represents the number of repeating units; and (iii) a blended composition including: an acrylonitrile and butadiene copolymer and a phenol formaldehyde polymer, wherein the phenol formaldehyde has the formula

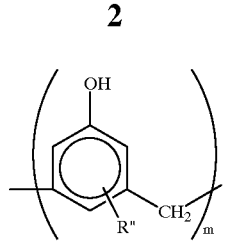

where R" is hydroxyl or an alkyl group and m represents the number of repeating units.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
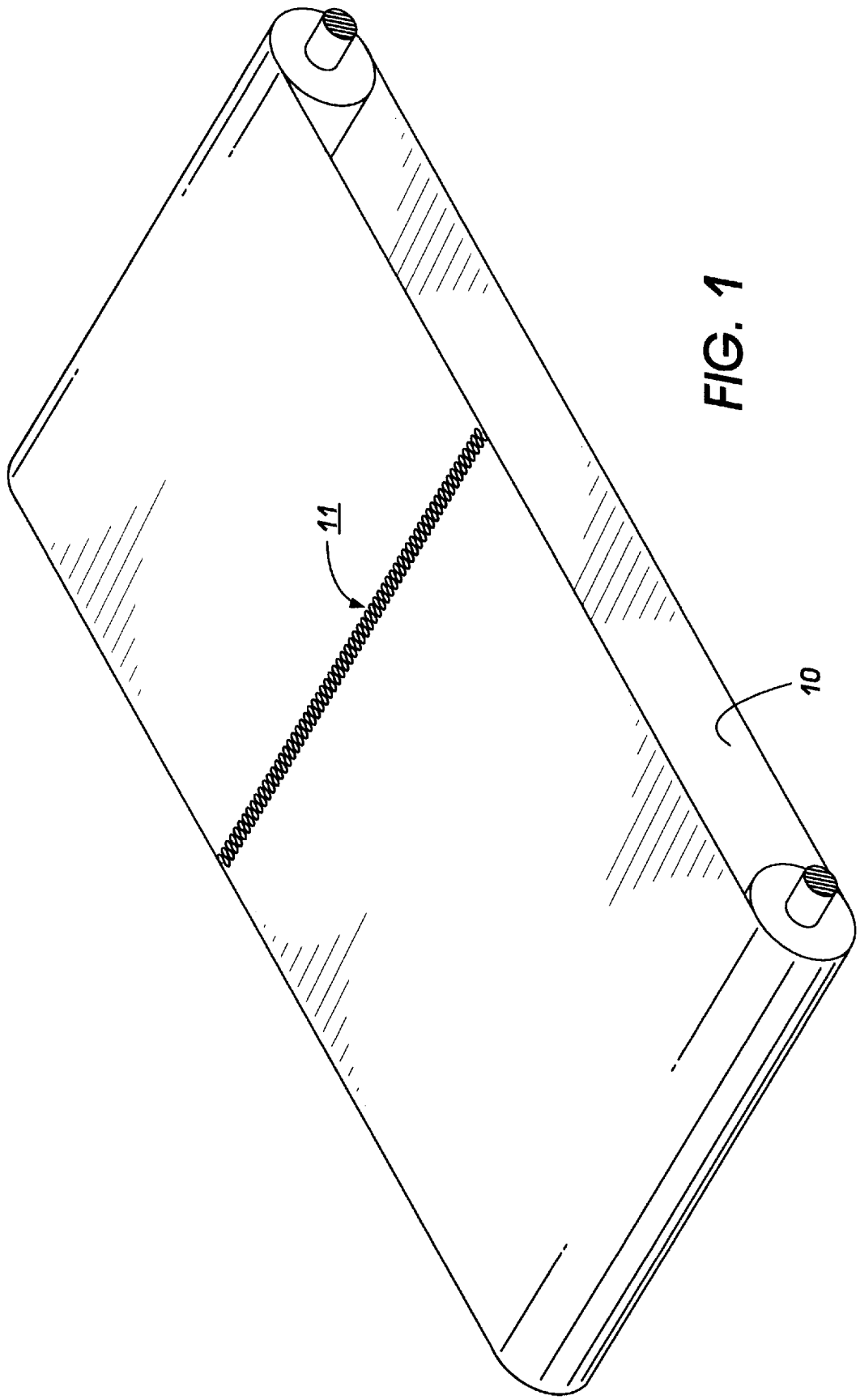
FIG. 1 is a perspective view of the present belt.
Figure 2:
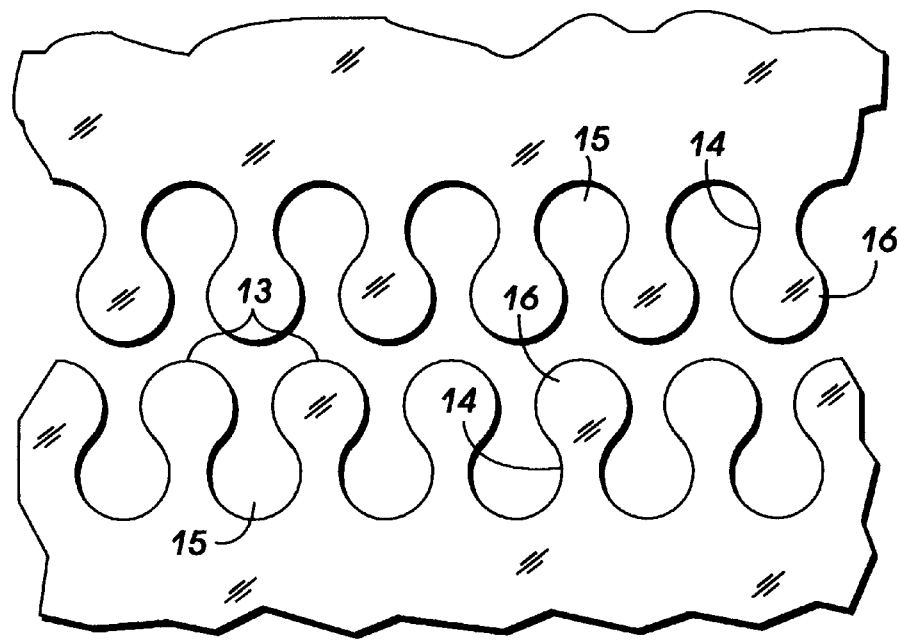
FIG. 2 is an enlarged, plan view of one embodiment of the mating elements of the present belt prior to interlocking of the mating elements.
Figure 9:
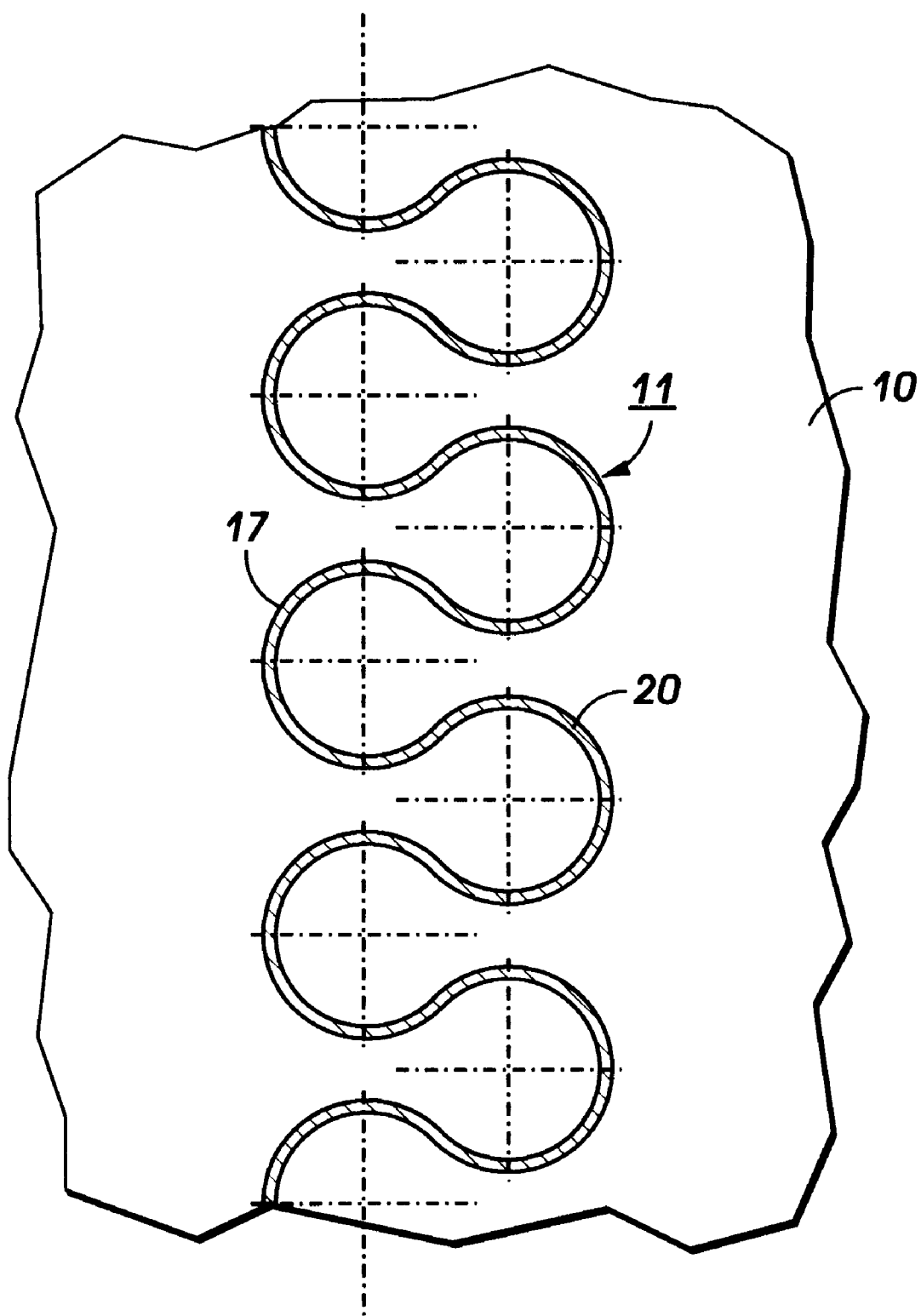
FIG. 9 is an enlarged, plan view of the seam containing the mating elements depicted in FIG. 2 and the adhesive.

FIG. 1 depicts one embodiment of the present belt 10 having the seam 11. As seen in FIG. 2, the seam is formed by joining together mating elements (13,15) in an interlocking relationship. As used herein, the phrase mating elements is also referred to as nodes. FIGS. 2–5 depict different embodiments of the mating elements. As best seen in FIG. 9, there is a space 20 between the interlocked mating elements which is at least partially filled or totally filled by an adhesive 17.

The mating elements of the belt ends preferably have a shape that interlock together in the manner of a puzzle cut, meaning that the two ends interlock with one another in the manner of an ordinary puzzle together. A chemically and physically compatible adhesive at least partially fills the space (also referred herein as kerf) between the mutually mating elements in the seam. The puzzle cut mating elements provide an improved seam quality and smoothness with substantially no thickness differential between the seam and the rest of the belt. Further, it should be noted that the lower the differential in height the faster that the belt may travel. The mating elements preferably are joined to result in a butt joint rather than for example an overlap joint to minimize the seam height. While the seam is illustrated in FIG. 1 as being perpendicular to the two parallel sides of the belt, it will be understood that the seam may extend across the entire width of the belt and may be angled or slanted with respect to the parallel sides. This enables any noise generated in the system to be distributed more uniformly and the forces placed on each mating element or node to be reduced. It is desired that the seam height differential between the seam and the unseamed portion of the belt adjacent the seam is no more than about 25 micrometers, that the seam possesses a flex life and continuity of strength ranging from about 80% to about 90% of the belt material, and that the seam possesses a flex life of at least about 1 million cycles, preferably at least about 2 million cycles, without seam failure. Preferably, the mating elements have a node radius (i.e., individual mating element radius) of about 0.5 mm and a spacing between the interlocked mating elements of about 25 micrometers.

The belt material is selected to have the appropriate physical characteristics for specific utilities. For example, where the belt is employed as an intermediate toner image transfer member, the belt may have the following illustrative properties: tensile strength, Young's modulus, typically $1 \times 10^3$ to $1 \times 10^6$ psi; electroconductivity, typically $10^8$ to $10^{11}$ ohm cm volume resistivity; thermal conductivity; mechanical, chemical, and electrical stability in both static and under dynamic conditions; flex strength; and in certain applications, such as transfix (where the intermediate toner image transfer member is also used to fuse the toner image), stability when subjected to high temperatures. Other important characteristics of the belt material, depending on its use, include low surface energy for good toner release, gloss, dielectric constant, and strength.

The puzzle cut pattern for the mating elements may be formed according to any conventional shaping technique, such as by die cutting or laser cutting with commercially available lasers, such as a $CO_2$ laser or excimer laser generating a beam of sufficient width and intensity that within an acceptable time will provide the desired cut. Following cutting by the laser beam the mating elements can be deburred and cleaned by air, ultrasonics or brushing if necessary.

Figure 3:
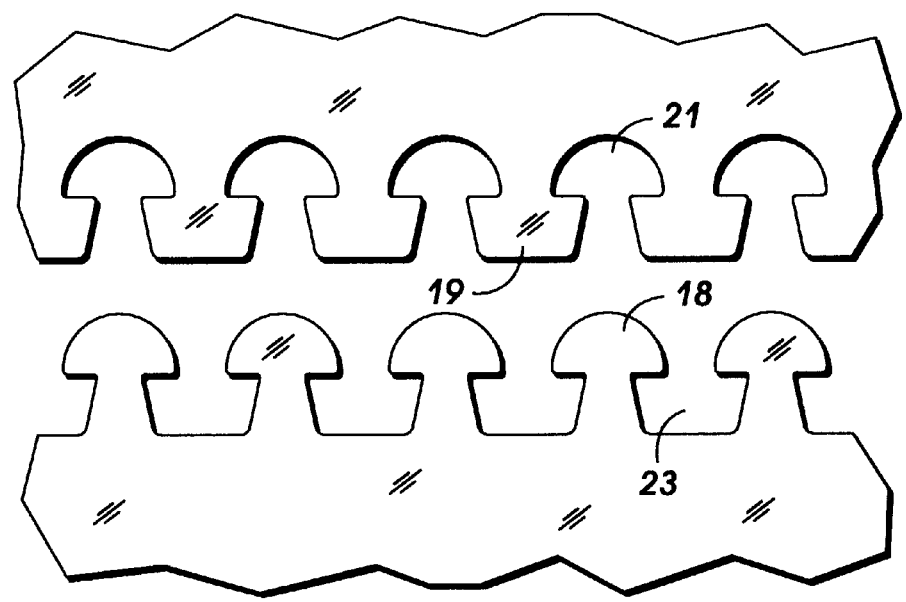
FIG. 3 is an enlarged, plan view of a second embodiment of the mating elements of the present belt prior to interlocking of the mating elements.
Figure 4:
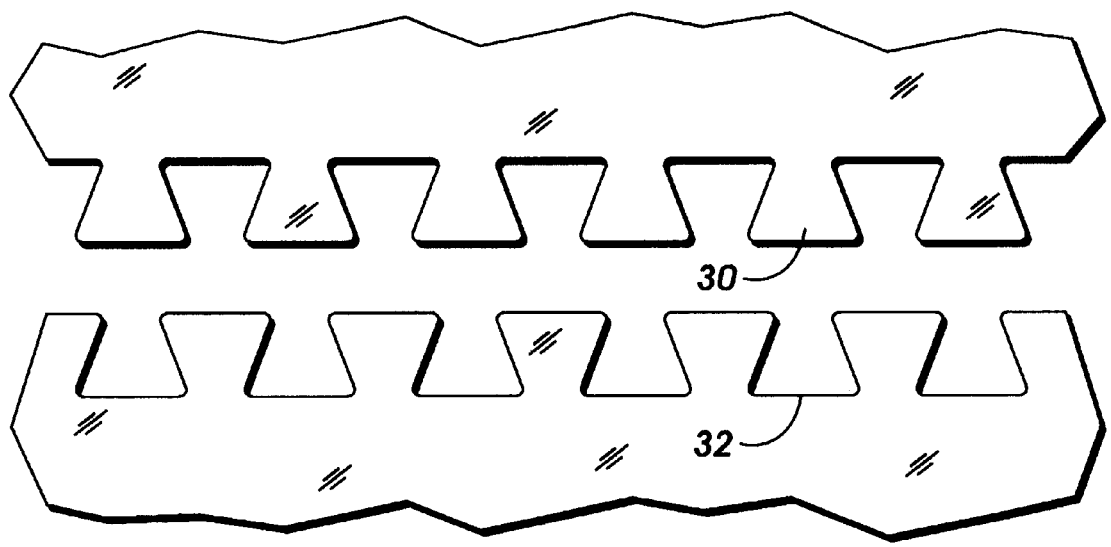
FIG. 4 is an enlarged, plan view of a third embodiment of the mating elements of the present belt prior to interlocking of the mating elements.
Figure 5:
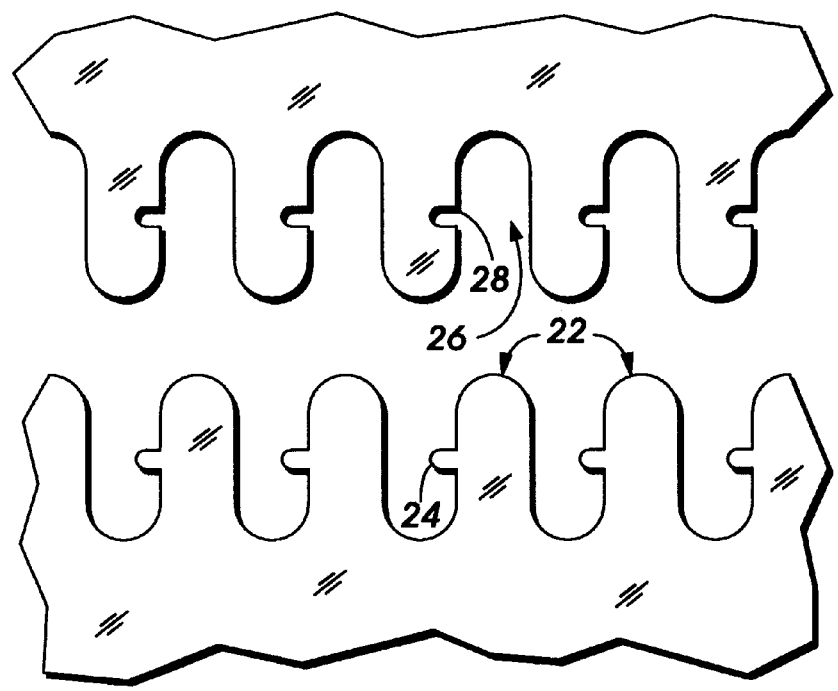
FIG. 5 is an enlarged, plan view of a fourth embodiment of the mating elements of the present belt prior to interlocking of the mating elements.

As may be observed from the drawings, the puzzle cut pattern may take virtually any form, including that of nodes such as identical post or neck 14 and head 16, patterns of male 13 and female 15 interlocking portions as illustrated in FIG. 2, or a more mushroom-like shaped pattern having male portions 18 and 19 and female portions 21 and 23 as illustrated in FIG. 3 as well as a dovetail pattern having male portions 30 and female portions 32 as illustrated in FIG. 4. The puzzle cut pattern illustrated in FIG. 5 has a plurality of male fingers 22 with interlocking teeth 24 and plurality of female fingers 26 which have recesses 28 to interlock with the teeth 24 when assemblied. It is important that the interlocking elements all have curved mating elements to reduce the stress concentration between the interlocking elements. It has been found that with curved mating elements that the stress concentration is lower than with square corners where rather than the stress being uniformly distributed it is concentrated leading to possible failure.

To minimize the nonfunctional area of the belt, it is desirable to have the seam width be as narrow as possible. Further, this enables the seam to be indexed so that it does not participate in belt functionality such as the formation and transfer of a toner or developer image. Typically, the seam is from about 1 mm to about 3 mm wide.

The two ends of the belt material are joined by physically placing them together in interlocking relationship. This may require the application of pressure to properly seat or mate the interlocking elements.

Figure 6:
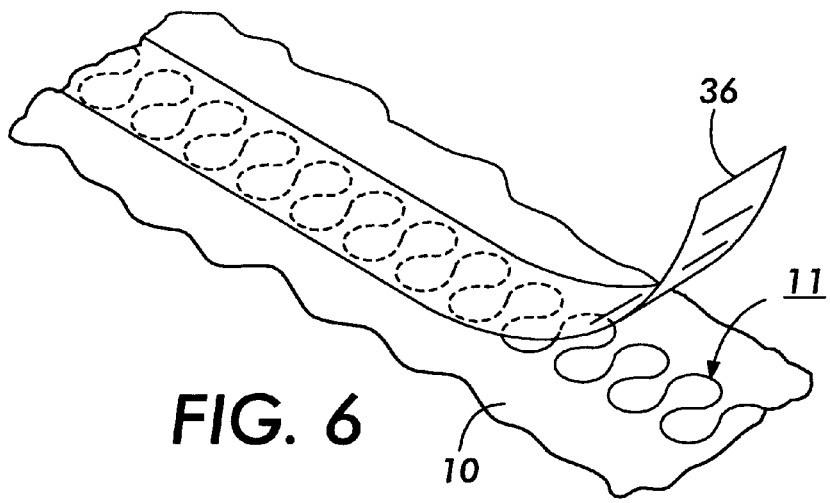
FIG. 6 is a perspective, partial view of one embodiment to apply the adhesive to the seam of the present belt.
Figure 7:
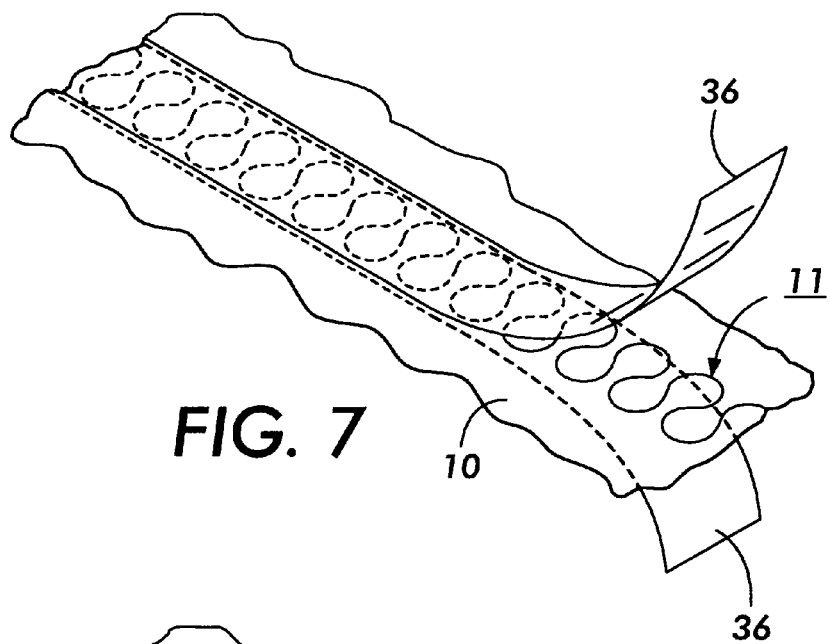
FIG. 7 is a perspective, partial view of a second embodiment to apply the adhesive to the seam of the present belt.
Figure 8:
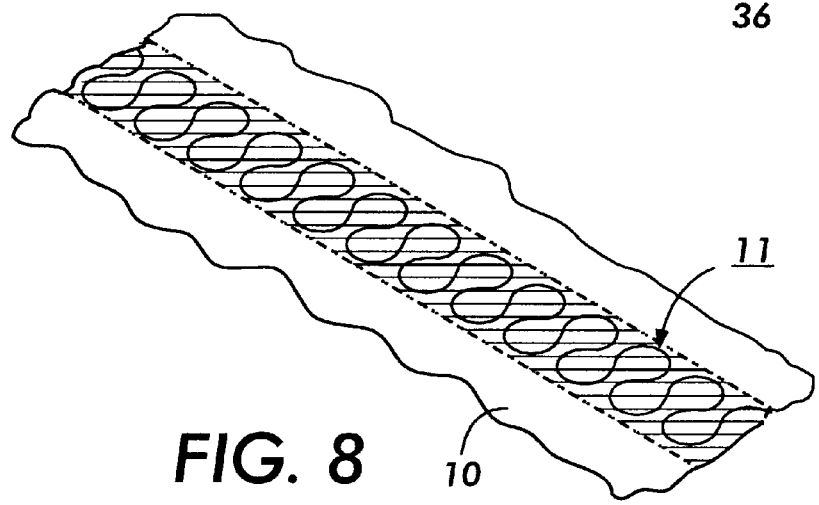
FIG. 8 is a perspective, partial view of the seam after heat and/or pressure has been applied to the strip containing the adhesive, enabling the adhesive to at least partially fill the space between the mating elements.

FIGS. 6–8 depict how to deposit the adhesive in the space between the mating elements. In FIG. 6, a strip 36 containing the adhesive is placed on one side of the seam prior to the application of heat and/or pressure to the strip to at least partially fill the space between the mutually mating elements. FIG. 7 depicts a similar representation of that shown in FIG. 6 wherein strips 36 containing the adhesive are placed on both sides of the seam 11. FIG. 8 is a representation of the seam 11 after heat/or pressure has been applied to the strip, enabling the adhesive from the strip to at least partially fill the space between the mating elements. In FIG. 8, the strip 36 (not shown in this figure) contains an adhesive applied onto a release liner. The strip is applied over the seam 11 and moderate heat and pressure are applied to tack the adhesive to the nodes of the seam. The release liner is then pulled away from the adhesive. The adhesive (shown in FIG. 8) stays over the nodes and is again subjected to more aggressive heat and temperature to flow and cross link the adhesive.

The adhesive may be applied as a strip over the seam or as a coating on a release liner which may be removed after the bond has been formed. Typically, such release liners include release papers coated with silicone, wax, or other surface releasing agent. It is important that the heat applied to the adhesive and the belt material does not exceed that which would both form the seam and break it by melting it or decomposing it. Heat sources include an impulse welder, conventional heated rolls, a simple heated iron, ultrasonic welder or a two roll heated nip providing a combination of heat and pressure.

Preferably, the size of the strip 36 is at least as wide as the seam and not narrower than the seam and is of a thickness to provide a quantity of adhesive to fill the kerf between the elements. In this regard it should also be noted that it may be possible to first apply heat to the mating elements and the strip 36 and subsequently apply pressure while they are still in a softened condition to force the softened adhesive into the spaces between the mating elements. The pressure applied should be sufficient to fill the space and to minimize thickness of any bonded joint. While this process clearly provides a physical bonding between the belt material and the adhesive, it may also provide a chemical bond. Preferably, the adhesive is applied -with a release liner. In embodiments, the adhesive applied with a release liner gave significantly higher seam strength than the same adhesive applied with pin striping and air brush application techniques.

The belt of the present invention can be of at least three different configurations. In one embodiment of the invention, the belt is of a single layer configuration. Preferable, the single layer is composed of a polyimide filled with an electrically conductive filler (also referred herein as electrical property regulating particles). The preferred electrically conductive fillers are doped metal oxide fillers such as antimony doped tin oxide, antimony doped titanium dioxide, aluminum doped zinc oxide, similar doped metal oxides, and mixtures thereof.

The polyimide material including the electrical property regulating particles is suitable for allowing a high operating temperature (i.e., greater than about 180, preferably greater than about 200° C. and more specifically, from about 200 to about 350° C.), capable of exhibiting high mechanical strength, providing heat conducting properties (this, in turn, improves the thermal efficiency of a fusing system employing the belt), and possessing tailored electrical properties.

The polyimide material can be any suitable high tensile modulus polyimide capable of becoming a conductive film upon the addition of electrically conductive particles. A polyimide having a high tensile modulus is preferred primarily because the high tensile modulus optimizes the film stretch registration and transfer or fix conformance. The polyimide has the advantages of improved flex life and image registration, chemical stability to liquid developer or toner additives, thermal stability for transfix applications and for improved overcoating manufacturing, improved solvent resistance as compared to known materials used for film for transfer components, and improved electrical properties including a uniform resistivity within the desired range. Suitable polyimides include those formed from various diamines and dianhydrides, such as poly(amide-imide), polyetherimide, siloxane polyetherimide block copolymer such as, for example, SILTEM STM-1300® available from General Electric, Pittsfield, Mass., and the like. Preferred polyimides include aromatic polyimides such as those formed by reacting pyromellitic acid and diaminodiphenylether sold under the tradename KAPTON®-type-HN available from DuPont. Another suitable polyimide available from DuPont and sold as KAPTON®-Type-FPC-E, is produced by imidization of copolymeric acids such as biphenyltetracarboxylic acid and pyromellitic acid with two aromatic diamines such as p-phenylenediamine and diaminodiphenylether. Another suitable polyimide includes pyromellitic dianhydride and benzophenone tetracarboxylic dianhydride copolymeric acids reacted with 2,2-bis(4-(8-aminophenoxy) phenoxy)-hexafluoropropane available as EYMYD® type L-20N from Ethyl Corporation, Baton Rouge, La. Other suitable aromatic polyimides include those containing 1,2,1',2'-biphenyltetracarboximide and para-phenylene groups such as UPILEX®-S available from Uniglobe Kisco, Inc., White Plains, N.Y., and those having biphenyltetracarboximide functionality with diphenylether end spacer characterizations such as UPILEX®-R also available from Uniglobe Kisco, Inc. Mixtures of polyimides also can be used.

In a preferred embodiment, the polyimide is subjected to fluorine gas to produce a fluorinated polyimide film. This treatment reduces the surface energy, thereby improving the fusing ability and reducing the occurrence of hot offset.

The polyimide is present in the one layer belt in an amount of from about 60 to about 99.9 percent by weight of total solids, preferably from about 80 to about 90 percent by weight of total solids. Total solids as used herein includes the total percentage by weight of polymer, conductive fillers and any additives in the layer.

In embodiments where the belt is a single layer, the polyimide layer has a thickness of from about 25 to about 150 micrometers, preferably from about 50 to about 100 micrometers, and particularly preferred from about 50 to about 75 micrometers. The layer has an initial modulus of from about 300 PSI to about 1.5 million PSI. The electrical surface resistivity of this one layer belt is from about $10^4$ to about $10^{16}$ ohm/sq, preferably from about $10^6$ to about $10^{14}$ ohms/sq, and particularly preferred from about $10^8$ to about $10^{12}$ ohm/sq. The preferred volume resistivity is from about $10^4$ to about $10^{11}$, preferably from about $10^7$ to about $10^{11}$ ohm-cm. The tensile modulus of the belt herein is preferably from about 300,000 to about 1,500,000 PSI and more preferably from about 500,000 to about 1,000,000 PSI. The tensile strength is, for example, from about 15,000 to about 57,000 PSI and preferably from about 25,000 to about 55,000 PSI. Further, the tensile elongation is preferably from about 5 to about 75%.

It is preferable that the polyimide used as the single layer herein have a smooth surface with roughness (Rz) of less than about 10 micrometers, preferably from about 0.5 to about 10 micrometers. Further, it is desirable that the polyimide layer has a surface energy of less than about 40, and preferably from about 20 to about 30 dynes/cm, or alternatively, be used with toners which contain a wax or long chain aliphatic hydrocarbon component which when melted function to prevent toner adhesion to the polyimide surface.

The belt has a width, for example, of from about 150 to about 2,000 mm, preferably from about 250 to about 1,400 mm, and particularly preferred is from about 300 to about 500 mm. The circumference of the belt is from about 75 to about 2,500 mm, preferably from about 125 to about 2,100 mm, and particularly preferred from about 155 to about 550 mm.

The one layer belt may be prepared by preparation of the polyimide, for example, by using the reaction product of a diamine with a dianhydride dissolved in a solvent such as N-methyl-2-pyrrolidone. An appropriate amount of filler is then added and dispersed therein in order to provide a surface resistivity of from about $10^4$ to about $10^{12}$, preferably from about $10^6$ to about $10^{12}$, and particularly preferred of from about $10^8$ to about $10^{11}$ ohms/sq. The filler is added and the mixture is pebble milled in a roller mill, attritor or sand mill. The poly(amic acid) filler mixture is cast onto a surface, the solvent removed by evaporation and heated to convert the poly(amic acid) to polyimide. After addition of the filler particles, the polyimide Layer may be formed by for example extrusion.

In another embodiment of the invention, the belt is of a two layer configuration. The belt may include the electrically conductive polyimide substrate layer as set forth above and thereover, an outer layer. The substrate layer imparts mechanical strength and the outer layer imparts conformability to a wide range of toner pile heights for superior fix where the belt may be part of a fusing subsystem. The outer layer can also be of a high hardness adequate to fix toner to smoother substrates or low volume xerographic devices.

In the two layer configuration, the substrate layer is preferably composed of a polyimide filled with a conductive filler. Preferably, the filler is a doped metal oxide filler such as aluminum doped zinc oxide (ZnO), antimony doped titanium dioxide ($TiO_3$), antimony doped tin oxide, similar doped oxides, and mixtures thereof. The outer layer is provided on the polyimide substrate layer. Preferably the outer layer is comprised of low surface energy (of for example, in embodiments, from about 20 to about 30 dynes/cm), and high temperature resistant materials such as silicone rubbers, fluoropolymers, urethanes, acrylic, titamers, ceramers, and hydrofluoroelastomers such as volume grafted fluoroelastomers.

Preferred materials for the outer layer include fluoroelastomers such as copolymers and terpolymers of vinylidenefluoride, hexafluoropropylene and tetrafluoroethylene, which are known commercially under various designations as VITON A®, VITON E®, VITON E60C®, VITON E45®, VITON E430®, VITON 910®, VITON GH®, VITON B50®, and VITON GF®. The VIFON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company.

Two preferred known fluoroelastomers are: (1) a class of copolymers of vinylidenefluoride, tetrafluoroethylene and hexafluoropropylene known commercially as VITON A®; and (2) a class of terpolymers of vinylidenefluoride, hexafluoropropylene, and tetrafluoroethylene known commercially as VITON B®. VITON A®, VITON B®, and other VITON® designations are trademarks of E.I. DuPont de Nemours and Company.

In another preferred embodiment, the fluoroelastomer is a tetrapolymer having a relatively low quantity of vinylidenefluoride. An example is VITON GF®, available from E.I. DuPont de Nemours, Inc. The VITON GF® has 35 mole percent of vinylidenefluoride, 34 mole percent of hexafluoropropylene and 29 mole percent of tetrafluoroethylene with 2 percent cure site monomer. The cure site monomer can be those available from DuPont such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomer.

In another embodiment of the invention, the fluoroelastomer is a volume grafted elastomer. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator.

Volume graft, in embodiments, refers to a substantially uniform integral interpenetrating network of a hybrid composition, wherein both the structure and the composition of the fluoroelastomer and polyorganosiloxane are substantially uniform when taken through different slices of the member. A volume grafted elastomer is a hybrid composition of fluoroelastomer and polyorganosiloxane formed by dehydrofluorination of fluoroclastomer by nucleophilic dehydrofluorinating agent followed by addition polymerization by the addition of alkene or alkyne functionally terminated polyorganosiloxane. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures of which are herein incorporated by reference in their entirety.

Other preferred polymers useful as the outer layer in the two layer configuration include silicone rubbers and preferably silicone rubbers having molecular weights of from about 600 to about 4,000, such as silicone rubber 552, available from Sampson Coatings, Richmond, Va., (polydimethyl siloxane/dibutyl tin diacetate, 0.45 g DBTDA per 100 grams polydimethyl siloxane rubber mixture, with molecular weight of approximately 3,500). Additional polymers useful as the outer layer include fluorosilicones, along with fluoropolymers such as polytetrafluoroethylene (PTFE), fluorinated ethylenepropylene copolymer (FEP), polyfluoroalkoxypolytetrafluoroethylene (PFA Teflon) and the like. These polymers, together with adhesives, can also be included as intermediate layers.

The polyimide layer of the two layer configuration has the properties as described above for the one layer configuration.

The outer layer of the two-layer configuration can be either soft or hard. The hardness of a hard outer layer is from about 1,000 to about 1.5 million PSI, and preferably from about 300,000 to about 1.0 million PSI. The hardness of a soft outer layer is preferably from about 300 to about 1,000 PSI, and preferably from about 500 to about 800 PSI. The outer layer of the two layer configuration has a thickness of from about 25 to about 5000 micrometers, and a preferred thickness of from about of 25 to about 500 micrometers. The preferred resistivity is from about $10^4$ to about $10^{16}$, preferably from about $10^6$ to about $10^{14}$, and particularly preferred from about $10^8$ to about $10^{12}$ ohm/sq. The preferred surface energy is less than about 40, and preferably from about 20 to about 30 dynes/cm The polymer comprising the outer layer is preferably present in the outer layer in an amount of from about 60 to about 99.9 percent, and preferably from about 80 to about 90 percent by weight of total solids.

The outer layer is coated on the substrate in any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating and the like. It is preferred to spray or flow coat the outer material.

In a third embodiment, the belt has a three layer configuration and is composed of a substrate layer having an electrically conductive filler dispersed therein, an intermediate layer (preferably a conformable layer) and an outer layer release layer provided on the intermediate layer. Preferably, the intermediate layer is composed of a fluoroelastomer, examples and properties of which have already been disclosed above, and the outer layer is composed preferably of a silicone rubber, examples and properties of which are set forth above. This three layer configuration provides superior conformability and is suitable for use in color xerographic machines.

In the three layer configuration, the substrate polyimide layer has the properties as described above. The intermediate layer is preferably a conformable layer. The intermediate layer has a surface energy of from about 20 to about 60 and preferably from about 30 to about 50 dynes/cm. The thickness of the intermediate layer is from about 25 to about 5,000, and preferably from about 25 to about 500 micrometers. Both the outer layer and the intermediate layer have a hardness of from about 25 to about 80 Shore A, preferably from about 40 to about 60 Shore A. The cuter layer is a relatively thin layer having a thickness of from about 5 to about 75, and preferably from about 10 to about 25 micrometers. The outer layer has a surface energy of less than about 40, and preferably from about 20 to about 30 dynes/cm.

The outer layer in the two layer configuration and the outer layer in the three layer configuration have the same surface resistivity as that of the polyimide layer in the one layer configuration. Further, the polymers of the intermediate and outer layers are preferably present in the respective layers in an amount of from about 60 to about 99.9 percent, and preferably from about 80 to about 90 percent by weight of total solids.

Preferably, a doped metal oxide is contained or dispersed in the polyimide layer. Preferred doped metal oxides include antimony doped tin oxide, aluminum doped zinc oxide, similar doped metal oxides, and mixtures thereof. Other conductive fillers can be added to the polyimide layer. Examples of additional conductive fillers include carbon blacks and graphite; and metal oxides such as tin oxide, antimony dioxide, titanium dioxide, indium oxide, zinc oxide, indium oxide, indium tin trioxide, and the like; and mixtures thereof. The additional filler (i.e., fillers other than doped metal oxide fillers) may be present in an amount of from about 1 to about 40 and preferably from about 4 to about 20 parts by weight of total solids.

In a preferred embodiment of the invention, the electrically conductive filler is antimony doped tin oxide. Suitable antimony doped tin oxides include those antimony doped tin oxides coated on an inert core particle (e.g., ZELEC® ECP-S, M and T) and those antimony doped tin oxides without a core particle (e.g., ZELEC® ECP-3005-XC and ZELEC® ECP-3010-XC). ZELEC® is a trademark of DuPont Chemicals Jackson Laboratories, Deepwater, N.J. The core particle may be mica, $TiO_2$ or acicular particles having a hollow or a solid core. Preferred forms of antimony doped tin oxide are commercially available under the tradename ZELEC® ECP (electroconductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC ECP-T), and a plate shaped mica core product (ZELEC® ECP-M).

In a particularly preferred embodiment of the invention, antimony doped tin oxide is added to the polyimide layer in an amount of about 5 to about 65 percent by weight of total solids, preferably from about 10 to about 50 percent by weight of total solids, and particularly preferred of from about 10 to about 30 percent by weight of total solids in the layer. Total solids is defined as the amount of polymer, filler(s), and any additives.

Optionally, any known and available suitable adhesive layer may be positioned between the polyimide substrate and the outer conformable layer in the two layer configuration. An adhesive layer may be positioned between the polyimide substrate and the intermediate conformable layer and/or between the conformable layer and the release layer in the three layer configuration. Examples of suitable adhesives include Dow Corning A4040® prime coat, which is especially effective when used with fluorosilicone layers, and Dow TACTIX® blends, Ciba-Geigy ARALDITE® MY-721 and Morton THIXON® 330/311, all of which are suitable for use with fluoropolymer and silicone rubber layers. The adhesive layer may have the same electrical properties as one or more of the layers.

Additives may be present in any of the above described layers.

Desirable properties for the belt when it is for example an intermediate toner image transfer belt are shown in Table 1 below.

| Properties | Inventive Belt |
|---|---|
| Thickness (micrometers) | 80 plus/minus 15 |
| Lateral resistivity (log ohms/square) | 11.8 plus/minus 0.6 |
| Volume resistivity (log ohm cm) | 10.6 plus/minus 1.4 |
| Flex life (cycles) | $>2 \times 10^6$ |
| Seam height (Micrometers) | <25 |
| Flatness (mm) | <0.8 |
| Surface roughness Rz (Micrometers) | <1 |
| Tensile modulus (Kg/mm$^2$) | >200 |
| Tensile strength (Kg/cm$^2$) | >400 |
| Creep % | <0.08 |

One preferred adhesive for joining the ends of the belt is PLYMASTER 213®, available from Norwood Coated Products, which is believed to be a polyvinyl butyral composition including: a terpolymer of polyvinyl butyral, polyvinyl alcohol, and polyvinyl acetate, and a plasticizer. The terpolymer may be present in the polyvinyl butyral composition in an amount ranging from about 80 to about 95% by weight of the composition, the balance being the weight for example of the plasticizer. The polyvinyl butyral may be present in an amount ranging from about 80 to about 90% by weight of the terpolymer. The polyvinyl alcohol may be present in an amount ranging from about 10 to about 20% by weight of the terpolymer. The polyvinyl acetate may be present in an amount ranging from about 1 to about 3% by weight of the terpolymer. The plasticizer may be a dialkyl phthalate where the alkyl can have two to eight carbon atoms. The preferred seaming conditions for the PLYMASTER 213® are impulse welding for 30 seconds at 350–400° F.

The adhesive bond of the polyvinyl butyral composition may be further modified by reacting the polyvinyl butyral composition with a thermosetting resin. This is accompolished by utilizing the chemical reactivity of free hydroxyl groups in the vinyl acetal moiety of the polyvinyl butyral composition. Typical materials to use for curing the polyvinyl butyral composition include phenolic, epoxies, dialdehydes, isocyanates and melamines. Crosslinking the polyvinyl butyral composition insolubilizes the polymer and increases the solvent selection and latitude for choosing an outer layer coating.

Another preferred adhesive for joining the ends of the belt is PLYMASTER 2530®, available from Norwood Coated Product, which is believed to be a polyurethane composition including a polyester polyurethane polymer having the formula

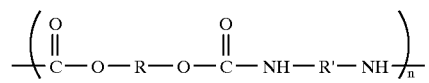

where R is a saturated aliphatic polyester such as poly (hexamethylene adipate and R' is an aliphatic or aromatic moiety having from 2 to 13 carbon atoms that can be derived from a diisocyanate such as toluene-2,4-diamine; hexamethylenediamine; and p, p'-diaminodiphenylmethane. The symbol n in the formula represents the number of repeating units which can range for example from about 10 to about 1,000.

Other preferred adhesives for joining the ends of the belt are PLYMASTER HT 4031®, PLYMASTER HT 4033®, PLYMASTER HT 4041XP®, which are believed to be a blended composition including: an acrylonitrile and butadiene copolymer and a phenol formaldehyde polymer, wherein the phenol formaldehyde has the formula

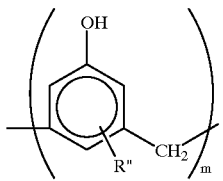

where R" is hydroxyl or an alkyl group having for example from about two to eight carbon atoms. The symbol m in the formula represents the number of repeating units which can range for example from about 10 to about 1,000. The molar ratio of acrylonitrile to butadiene in the copolymer may range from 3:1 to 1:3. The acrylonitrile and butadiene copolymer may be present in an amount ranging from about 30 to about 70% by weight of the blended composition. The phenol formaldehyde may be present in an amount ranging from about 30 to about 70% by weight of the blended composition.

To improve seam ripple in the belt, a post cure technique can be employed. This technique involves placing a thin steel shim inside the previously fabricated belt. The shim expands against the inside walls of the belt and places tension on the inside. The belt is then subjected to a post cure of 15 minutes at about 350° F. In the case of a belt fabricated using the PLYMASTER 213® adhesive, ripple improved from a rating of 4 (several ripples) to a rating of 8 (very few). The ripple rating is a subjective rating by at least two persons on the quality of the seam ripple.

The present belt can be employed as an intermediate toner image transfer belt or as a fusing belt in an electrostatographic printing machine.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

EXAMPLES

Four inventive belts were prepared using the following procedures.

| Process | Flow | Control Point | Target |
|---|---|---|---|
| Forming/ Cutting | Cut preform for parallel edges Cut first end in puzzle shape | Use template | 374 mm × 1050 mm |
|  | Extend material for second end puzzle cut | Tip to tip distance Check node quality | 529.7 mm from die None to be broken or bent |
| Assembling Belt | Mate puzzle using vacuum positioning | Visual Node placement | All nodes even and flat |
|  | Clean with solvent to remove cutting oil | Visual | No oil remaining |
| Welding Seam | Apply thermal plastic adhesive strip Close impulse welder | Tape width Tape over mated seam Visual, Pressure | 3 mm All nodes flat and covered All of seam under welder |

-continued

| Process | Flow | Control Point | Target |
|---|---|---|---|
|  | Apply heat | Time Temperature | Pressure 50–150 PSI 13 sec 290° F. |
|  | Dwell with welder closed | Time 1 min. |  |
| Quality Inspection | Measure circumference | Dimensions Conicity | 527.8 mm ± 0.5 mm <0.5 mm |
|  | Visual seam quality | Node placement Seam height Ripple | All even <25 micrometers <3 Ripples per width |

Additional parameters were as follows. Each belt was a single layer configuration with a polyimide layer. The polyimide layer had a thickness of about 75 micrometers and was composed of DuPont 300 PB. The mating element configuration of FIG. 2 was employed with a 0.5 mm mating element radius and a 25 micrometer space between the interlocked mating elements. A different adhesive for each belt was selected from the following to facilitate joining of the belt ends: PLYMASTER 213®, PLYMASTER 2530®, PLYMASTER HT 4033®, and PLYMASTER HT 4041XP®.

Figure 10:
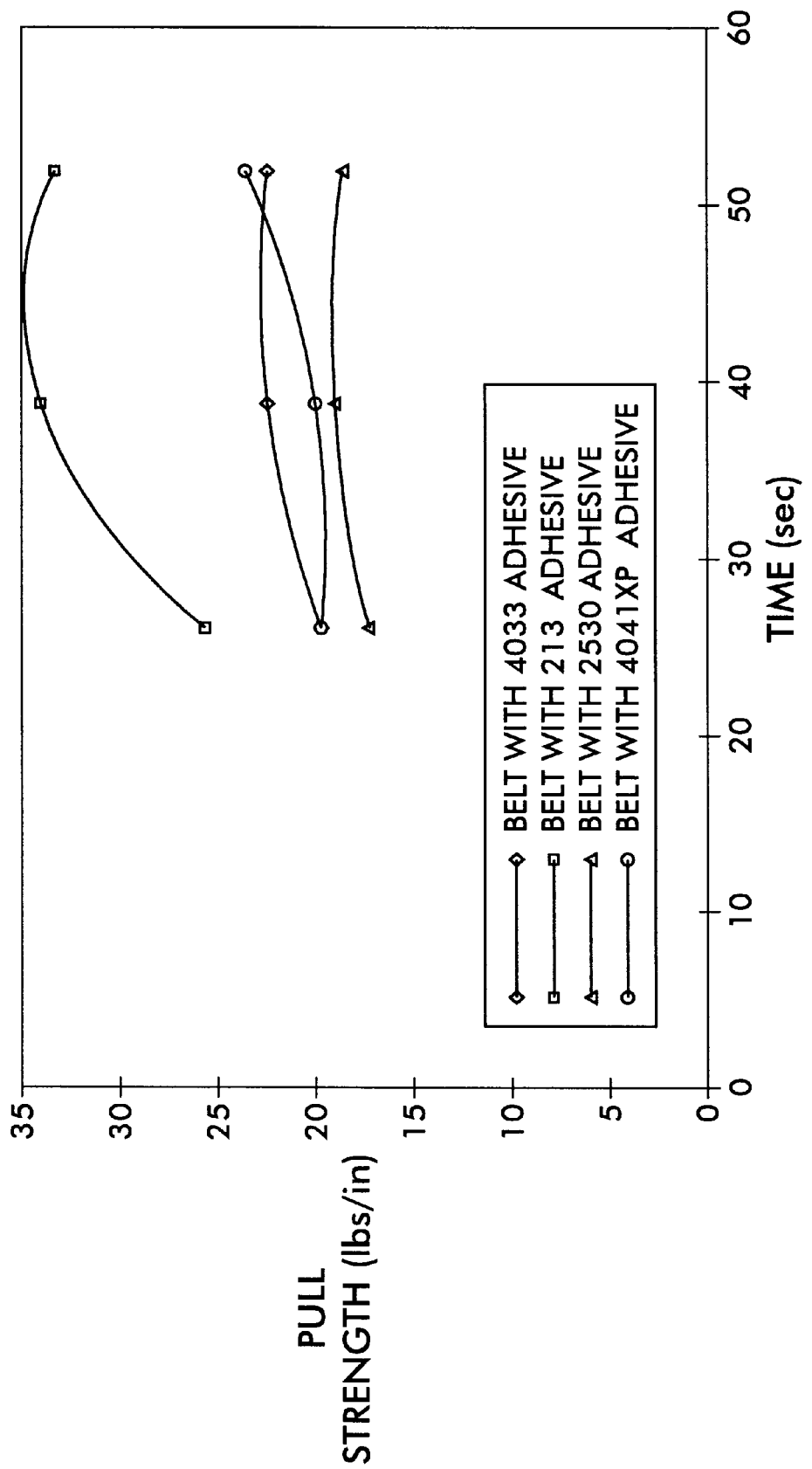
FIG. 10 is a graph illustrating the pull strength of several seamed belts employing different adhesives in the seam.

The adhesive strengths were determined yielding FIG. 10. The pull strength was determined utilizing the Instron 1122 with a 50 lb. tension load cell, air grips, crosshead speed of 0.2 in/min, sample size 1×4 in and a grip separation of 2 in. As shown in FIG. 10, all of the adhesives gave acceptable pull strength values (for these examples, the minimally acceptable pull strength was 17 lbs/in). This was achieved with relatively low seam heights. The 213 adhesive gave a significantly higher pull strength (up to about 35 lbs/in.) than the other three adhesives. Significantly, for the 213 adhesive, the nature of the failure mode changed from an adhesive failure to a polyimide material failure. The mating elements of the puzzle cut configuration were actually breaking with this adhesive system.

COMPARATIVE EXAMPLES

Three comparative belts were prepared using the same procedures as the above Examples except that a different adhesive selected from the following group (all available from Pellon Freudenberg) was employed to facilitate joining of the belt ends: SLR24, SP20, and SE70. The seam strength, height, and ripple were determined. Strength was measured using the Instron. Height in the seam area was measured with mechanical micrometers, which is a device with two flat surfaces brought together and zeroed. The two fat surfaces are separated and the material to be measured is placed between the flat surfaces. The surfaces are then tightened against the material to indicate the seam or material thickness. The thickness is then read on a digital readout. The Ripple Rating is from 1–10 (higher number is better with fewer ripples). The results are shown in Table 2.

| Sample | Chemical Class | Heat/ Dwell | One-Sided | | | Two-Sided | | |
|---|---|---|---|---|---|---|---|---|
| | | | Strength (lbs/in) | Height (in microns) | Ripple | Strength (lbs/in) | Height (in microns) | Ripple |
| SLR24 | Polyamide | Low | 9.56 | 35 | 7.5 | | | |
| | | Med | 14.1 | 25 | 6.7 | | | |
| | | High | 15.3 | 25 | 6.0 | 21.6 | 50 | 5 |
| SP20 | Polyester | Low | | | | | | |
| | | Med | 18.6 | 50 | 5.0 | 20.3 | 75 | 4 |
| | | High | 17.5 | 50 | 5.0 | 21.1 | 50 | 4 |
| SE70 | Polyethylene | Low | | | | | | |
| | | Med | 8.1 | 50 | 3.5 | | | |
| | | High | | | | | | |

In Table 2, "Low" refers to 10 seconds at 275° F., "Med" refers to +16 seconds at 300° F., and "High" refers to 20 seconds at 325° F.

These comparative belts are undesirable since they exhibited relatively high ripple at high temperatures. High temperatures are a concern since a fusing belt and an intermediate toner image transfer belt can be subjected to such high temperatures during their operation.

Figure 11:
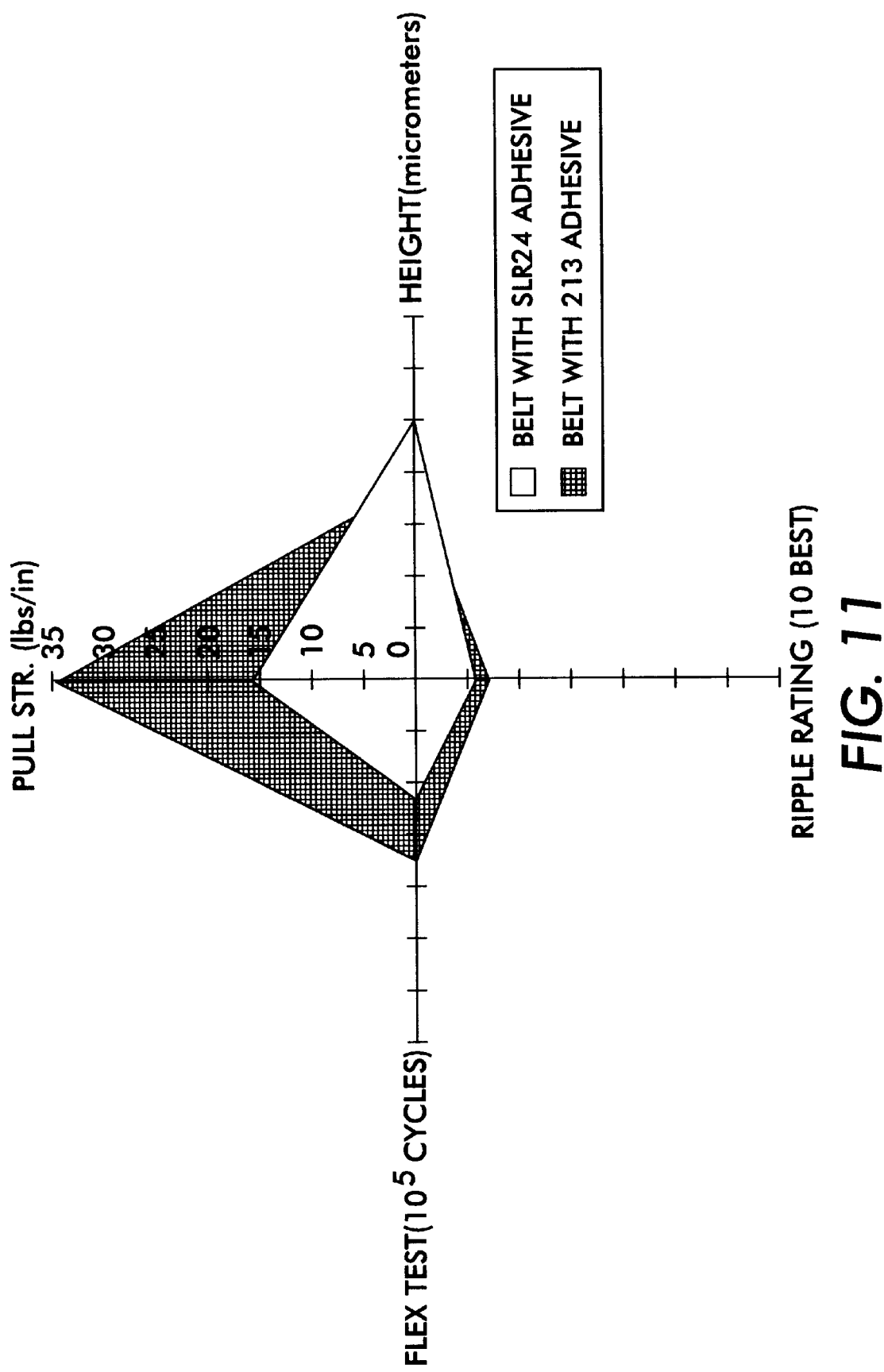
FIG. 11 is a graph comparing the properties of an inventive belt employing a preferred adhesive in the seam to a comparative belt employing a different adhesive in the seam.

FIG. 11 illustrates the performance of the comparative belt having the SLR24 adhesive (overall, the best performing of the three comparative belts) with the inventive belt having the PLYMASTER 213® adhesive (overall, the best performing of the four inventive belts). Clearly, the the inventive belt having the PLYMASTER 213® adhesive exhibited superior performance over the comparative belt having the SLR24 adhesive.

Other modifications of the present invention may occur to those skilled in the art based upon a reading of the present disclosure and these modifications are intended to be included within the scope of the present invention.

We claim:

1. A seamed belt comprising:
   (a) a belt material comprised of a polyimide and having two ends, each end having a plurality of mating elements, the two ends being joined to form a seam having the mating elements of the two ends in an interlocking relationship where the interlocked mating elements define a space between the interlocked mating elements; and
   (b) an adhesive present in the space between the interlocked mating elements, wherein the adhesive is selected from the group consisting of:
      (i) a polyvinyl butyral composition including: a terpolymer of polyvinyl butyral, polyvinyl alcohol, and polyvinyl acetate, and a plasticizer;
      (ii) a polyurethane composition including a polyester polyurethane polymer having the formula

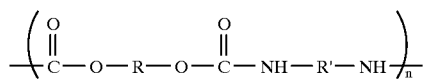

where R is a saturated aliphatic polyester, R' is an aliphatic or aromatic moiety having from 2 to 13 carbon atoms, and n represents the number of repeating units; and
      (iii) a blended composition including: an acrylonitrile and butadiene copolymer and a phenol formaldehyde polymer, wherein the phenol formaldehyde has the formula

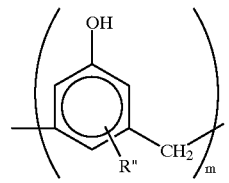

where R" is hydroxyl or an alkyl group and m represents the number of repeating units.

2. The belt of claim 1, wherein the adhesive is the polyvinyl butyral composition.

3. The belt of claim 1, wherein the belt material further includes a plurality of electrical property regulating particles.

4. The belt of claim 3, wherein the electrical property regulating particles are antimony doped tin oxide.

5. The belt of claim 1, wherein the polyimide is selected from the group consisting of aromatic polyimides, poly (amide-imide), polyetherimide, siloxane polyetherimide block copolymers and mixtures thereof.

6. The belt of claim 1, wherein the space between the interlocked mating elements is about 25 micrometers.

7. The belt of claim 1, wherein the adhesive is applied from a release liner.

8. The belt of claim 1, wherein the plasticizer is a dialkyl phthalate.

9. The belt of claim 1, wherein the seam has a height differential of no more than about 25 micrometers with a portion of the belt material adjacent the seam.

10. The belt of claim 1, wherein the adhesive is the polyvinyl butyral composition which is crosslinked.

* * * * *